US012079373B2

(12) United States Patent
Nortz et al.

(10) Patent No.: US 12,079,373 B2
(45) Date of Patent: *Sep. 3, 2024

(54) TRUSTED SYSTEM FOR SHARING USER DATA WITH INTERNET CONTENT PROVIDERS

(71) Applicant: AT&T Intellectual Property I, L.P., Atlanta, GA (US)

(72) Inventors: Douglas M. Nortz, Red Bank, NJ (US); Robert Sayko, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,716

(22) Filed: Nov. 21, 2022

(65) Prior Publication Data
US 2023/0088341 A1    Mar. 23, 2023

Related U.S. Application Data

(63) Continuation of application No. 16/884,650, filed on May 27, 2020, now Pat. No. 11,507,695.

(51) Int. Cl.
*H04L 29/06*    (2006.01)
*G06F 21/12*    (2013.01)
*G06F 21/60*    (2013.01)
*G06F 21/62*    (2013.01)

(52) U.S. Cl.
CPC ........ *G06F 21/6263* (2013.01); *G06F 21/128* (2013.01); *G06F 21/604* (2013.01)

(58) Field of Classification Search
CPC . G06F 21/6263; G06F 21/238; G06F 21/0443
See application file for complete search history.

(56) References Cited

U.S. PATENT DOCUMENTS

| 6,408,336 | B1 | 6/2002 | Schneider et al. |
| 7,909,245 | B1 | 3/2011 | Chaskin et al. |
| 7,962,571 | B2 | 6/2011 | Yuan et al. |
| 8,131,261 | B2 | 3/2012 | Roach, Jr. |
| 8,312,273 | B2 | 11/2012 | Nice et al. |

(Continued)

FOREIGN PATENT DOCUMENTS

| WO | 9840992 A2 | 9/1998 |
| WO | 2007048251 A1 | 5/2007 |

*Primary Examiner* — Evans Desrosiers

(57) ABSTRACT

A method includes receiving a request from an internet content provider to provide data about a subscriber associated with an IP address, where the data allows the internet content provider to maintain stateful and persistent information about an HTTP session with a user endpoint device associated with the IP address determining whether the Internet content provider is a trusted Internet content provider pre-authorized to receive at least some of the data about the subscriber, determining a subset of the data about the subscriber that is allowed to be shared with the Internet content provider, when the Internet content provider is determined to be a trusted Internet content provider, providing the subset of the data to the Internet content provider, when the subset of the data is determined, and denying the request to provide the data, when the Internet content provider is determined not to be a trusted Internet content provider.

20 Claims, 3 Drawing Sheets

(56) References Cited

U.S. PATENT DOCUMENTS

| | | |
|---|---|---|
| 8,332,930 B2 | 12/2012 | Burton et al. |
| 8,504,704 B2 | 8/2013 | Hardt |
| 8,769,621 B2 | 7/2014 | Wechsler et al. |
| 9,021,604 B2 | 4/2015 | Nicolas |
| 9,603,022 B2 | 3/2017 | Laarakkers et al. |
| 9,607,324 B1 | 3/2017 | Reed et al. |
| 9,819,491 B2 | 11/2017 | Kirkland et al. |
| 9,840,992 B2 | 12/2017 | Duncan et al. |
| 10,599,628 B2 | 3/2020 | Ali |
| 2004/0034799 A1 | 2/2004 | Mikami |
| 2007/0048251 A1 | 3/2007 | Arthur |
| 2007/0067297 A1* | 3/2007 | Kublickis ............... G06Q 30/02 707/999.009 |
| 2011/0214163 A1* | 9/2011 | Smith ..................... H04L 67/02 726/4 |
| 2013/0061288 A1 | 3/2013 | Paim |
| 2013/0166627 A1* | 6/2013 | Villegas .............. G06F 21/6263 709/203 |
| 2014/0150116 A1 | 5/2014 | Edwards |
| 2015/0312255 A1* | 10/2015 | Libonate ................ H04L 43/16 713/168 |
| 2017/0272316 A1* | 9/2017 | Johnson ............... H04L 61/301 |
| 2018/0121934 A1 | 5/2018 | Agarwal et al. |
| 2018/0357439 A1 | 12/2018 | Osotio |
| 2019/0318101 A1* | 10/2019 | Shaw, II ............... G06F 21/604 |

\* cited by examiner

TRUSTED SYSTEM FOR SHARING USER DATA WITH INTERNET CONTENT PROVIDERS

This application is a continuation of U.S. patent application Ser. No. 16/884,650, filed May 27, 2020, now U.S. Pat. No. 11,507,695, which is herein incorporated by reference in its entirety.

The present disclosure relates generally to data privacy, and relates more particularly to devices, non-transitory computer-readable media, and methods for sharing user data with Internet content providers via a trusted system.

BACKGROUND

Many websites use cookies in order to remember stateful information and/or to record user browsing history. Cookies are small pieces of data that websites send to users' computing devices; the computing devices' web browsers then store the cookies on the computing devices while the users are browsing. Cookies may be used, for instance, to remember the items that a user has added to an online shopping cart, to record the websites that the user has visited, or to determine when a user is logged into a website that requires a login, among other uses.

SUMMARY

The present disclosure broadly discloses methods, computer-readable media, and systems for sharing user data with Internet content providers via a trusted system. In one example, a method performed by a processing system of an Internet service provider network including at least one processor includes receiving a request from an internet content provider, wherein the request is a request to provide data about a subscriber associated with an internet protocol address, and wherein the data about the subscriber comprises data for allowing the internet content provider to maintain stateful and persistent information about a communication session over the world wide web between the internet content provider and a user endpoint device associated with the internet protocol address, determining whether the Internet content provider is a trusted Internet content provider which is pre-authorized to receive at least some of the data about the subscriber, determining a subset of the data about the subscriber that is allowed to be shared with the Internet content provider, when the Internet content provider is determined to be a trusted Internet content provider, providing the subset of the data about the subscriber to the Internet content provider, when the subset of the data about the subscriber is determined, and denying the request to provide the data about the subscriber, when the Internet content provider is determined not to be a trusted Internet content provider.

In another example, a non-transitory computer-readable medium may store instructions which, when executed by a processing system in a communications network, cause the processing system to perform operations. The operations may include receiving a request from an internet content provider, wherein the request is a request to provide data about a subscriber associated with an internet protocol address, and wherein the data about the subscriber comprises data for allowing the internet content provider to maintain stateful and persistent information about a communication session over the world wide web between the internet content provider and a user endpoint device associated with the internet protocol address, determining whether the Internet content provider is a trusted Internet content provider which is pre-authorized to receive at least some of the data about the subscriber, determining a subset of the data about the subscriber that is allowed to be shared with the Internet content provider, when the Internet content provider is determined to be a trusted Internet content provider, providing the subset of the data about the subscriber to the Internet content provider, when the subset of the data about the subscriber is determined, and denying the request to provide the data about the subscriber, when the Internet content provider is determined not to be a trusted Internet content provider.

In another example, a device may include a processing system including at least one processor and a non-transitory computer-readable medium storing instructions which, when executed by the processing system when deployed in a communications network, cause the processing system to perform operations. The operations may include receiving a request from an internet content provider, wherein the request is a request to provide data about a subscriber associated with an internet protocol address, and wherein the data about the subscriber comprises data for allowing the internet content provider to maintain stateful and persistent information about a communication session over the world wide web between the internet content provider and a user endpoint device associated with the internet protocol address, determining whether the Internet content provider is a trusted Internet content provider which is pre-authorized to receive at least some of the data about the subscriber, determining a subset of the data about the subscriber that is allowed to be shared with the Internet content provider, when the Internet content provider is determined not to be a trusted Internet content provider, providing the subset of the data about the subscriber to the Internet content provider, when the subset of the data about the subscriber is determined, and denying the request to provide the data about the subscriber, when the Internet content provider is determined to be a trusted Internet content provider.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
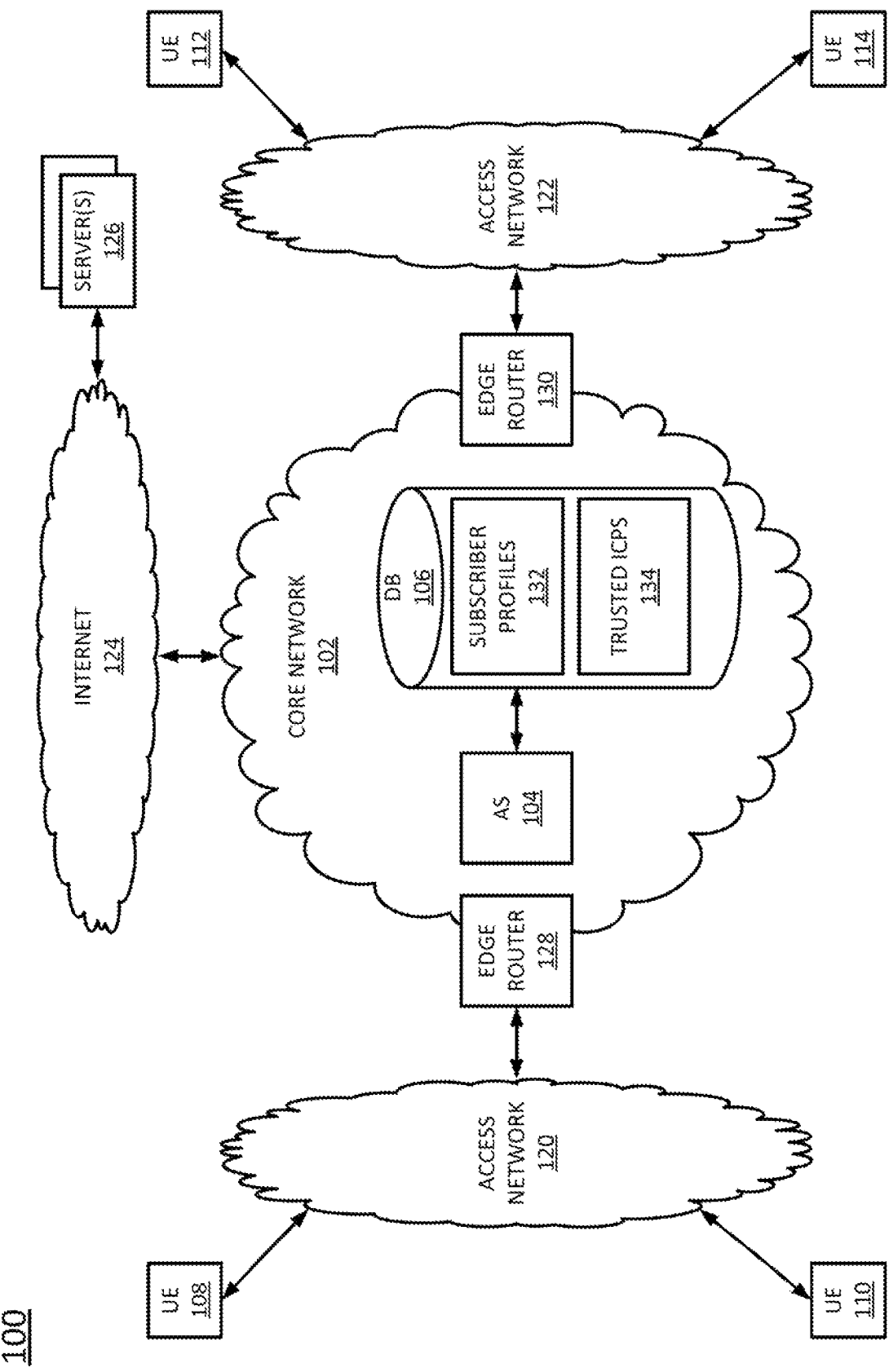
FIG. 1 illustrates an example system in which examples of the present disclosure for sharing user data with Internet content providers via a trusted system may operate.

The present disclosure broadly discloses methods, computer-readable media, and systems for sharing user data with Internet content providers via a trusted system. As discussed above, many websites use cookies in order to remember stateful information and/or to record user browsing history. Encrypted session cookies may be used, for instance, to remember the items that a user has added to an online shopping cart, to record the websites that the user has visited, or to determine when a user is logged into a website that requires a login, among other uses. These encrypted session cookies typically expire once the users are no longer browsing on the websites that sent the cookies. Thus, cookies can be very useful tools for Internet content providers and can provide a measure of convenience to users.

However, user backlash has been growing against persistent (long-lived or non-expiring) and third-party cookies that track users' histories and browsing behaviors even after the users have stopped browsing on the websites that sent the cookies. Storage of these more persistent cookies is often viewed by users as an invasion of privacy. Moreover, storage of these more persistent cookies often happens in the background of the computing devices, such that the users are not even aware that the cookies are being stored and accumulated. As such, measures have been taken to limit the use of many kinds of cookies. For instance, the European Union has passed a law that forces all Internet content providers to obtain explicit user consent before sending non-essential cookies to users' computing devices. Many web browsers also offer users the option to block cookies. These measures may greatly disrupt the browsing experience for users (e.g., users may constantly be asked for permission to send cookies or to unblock cookies), as well make it harder for Internet content providers to customize content or provide rich content services over the Internet.

Examples of the present disclosure, in essence, replace the use of cookies with a system that provides improved protection of user data, without disrupting the user's browsing experience or preventing trusted Internet service providers from providing customized content to users. In particular, examples of the present disclosure leverage the unique, trusted relationship that Internet service providers have both with their subscribers (e.g., end users who do not want cookies stored on their computing devices) and with trusted Internet content providers (who need to know information about the end users). As an added advantage, the elimination of cookies, which may be sent with every message between a user endpoint device and a web site, may also improve the performance of the web site.

With the advent of Carrier Grade Network Address Translation (CG-NAT), which many Internet service providers are deploying to conserve Internet Protocol version 4 (IPv4) address space, the uniqueness of an end user's IP address to Internet Content Providers has become a thing of the past. However, the Internet service providers still know the links between the IP addresses and the end users (or end user households, in the case of wireline Internet access), as the Internet service providers maintain accounts for the end users. Thus, in one example of the present disclosure, an Internet service provider becomes an intermediary between the end users and the Internet content providers.

In one particular example, an Internet service provider may maintain a subscriber database that contains, for each of the Internet service provider's subscribers, a profile. The profile for a subscriber may contain at least some of the data for the subscriber that would normally be stored in a cookie. Then, when the subscriber connects to an Internet content provider, the Internet content provider may query the Internet service provider for the subscriber's data based on the subscriber's IP address. Upon verifying that the Internet content provider is a trusted Internet content provider, the Internet service provider may provide at least some of the data stored in the subscriber profile that is associated with the IP address to the trusted Internet content provider. In this way, subscribers may continue to receive customized content from trusted Internet content providers, while sensitive subscriber information may be protected from untrusted Internet content providers who may attempt to store persistent cookies on subscriber computing devices. Additionally, the elimination of cookies means that there is less data stored on a subscriber's device in the event of a hack.

Within the context of the present disclosure, an "Internet service provider" is understood to refer to an entity that provides its subscribers with services for accessing and using the Internet. An "Internet content provider" is understood to refer to an entity that provides content (e.g., a shopping web site, a corporate web site, an education web site, a video conferencing web site, a news web site, a social media web site, or the like) to users over the Internet. A "trusted" Internet content provider is an Internet content provider that has been vetted in some way such that the Internet content provider has been pre-authorized to receive user data. These and other aspects of the present disclosure are discussed in greater detail below in connection with the examples of FIGS. 1-3.

To further aid in understanding the present disclosure, FIG. 1 illustrates an example system 100 in which examples of the present disclosure for sharing user data with Internet content providers via a trusted system may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may be associated with Internet content providers, e.g., entities that provide content (e.g., news, blogs, videos, music, files, products, services, or the like) in the form of websites to users over the Internet 124. Thus, some of the servers 126 may comprise content servers, e.g., servers that store content such as images, text, video, and the like which may be served to web browser applications executing on the user endpoint devices 108, 110, 112, and 114 in the form of websites.

Figure 3:
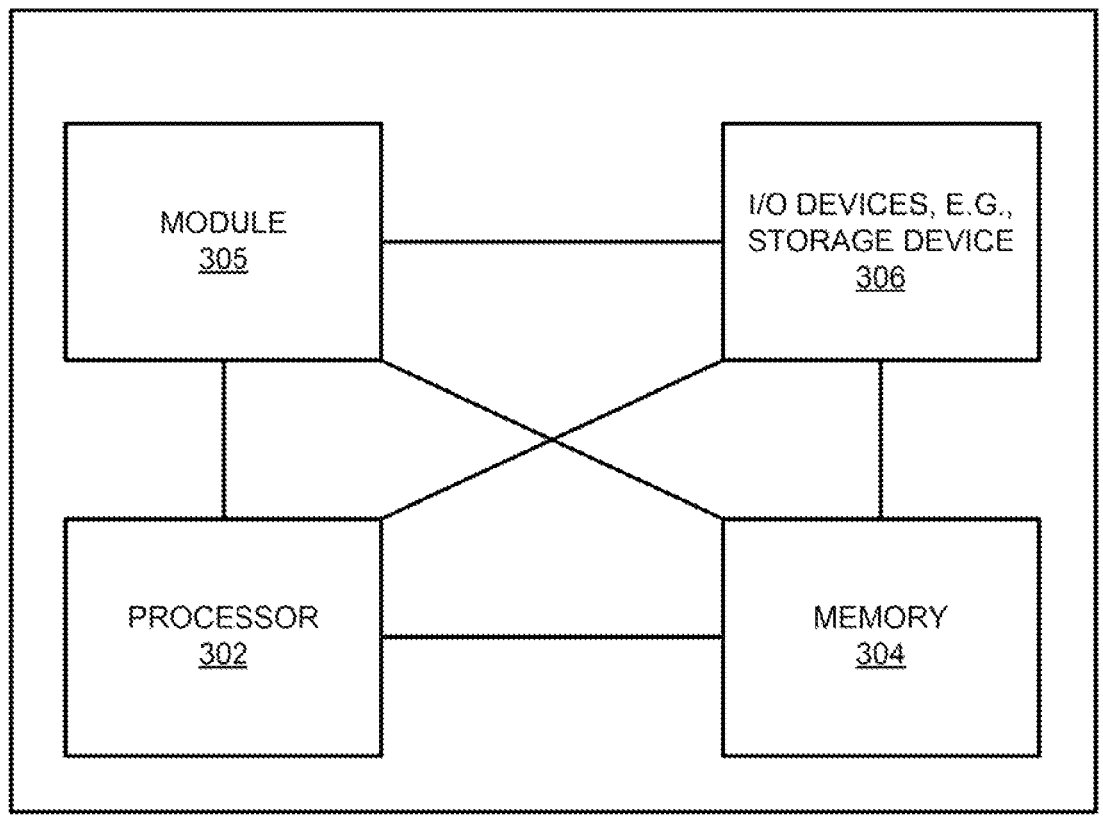
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for sharing user data with Internet content providers via a trusted system, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to receive queries from Internet content providers associated with the servers 126, where the queries comprise requests for data about the users of the user endpoint devices 108, 110, 112, and 114. The requested user data may comprise one or more types of data that are normally stored in cookies. The AS 104 may be further configured to verify that the Internet content providers from whom the queries are received are trusted (e.g., pre-authorized to receive at least some types of user data). When an Internet content provider is trusted, the AS 104 may provide at least some of the requested user data to the Internet content provider; however, when an Internet content provider is not trusted, the AS 104 may deny the query.

In a further example, the AS 104 may include functionality to resolve domain name server (DNS) queries. For instance, the AS 104 may receive requests from the user endpoint devices 108, 110, 112, and 114 to translate domain names (e.g., examplebank.com) into IP addresses (e.g., 123.456.789.123) with which the user endpoint devices 108, 110, 112, and 114 may connect to desired websites.

In order to verify the trusted status of Internet content providers and to provide user data to trusted Internet content providers, the AS 104 may retrieve information stored in the DB 106. For instance, the DB 106 may store subscriber (user) profiles 132 for subscribers of an Internet service provider which operates the core network 102 and a list of trusted Internet content providers (ICPs) 134.

In one example, each subscriber profile may store, for an associated subscriber, a set of data that is commonly stored in cookies. For instance, the subscriber profile may include at least one of the following types of data: subscriber name, subscriber identifier (e.g., a numerical or alphanumeric identifier that does not identify the subscriber by name), subscriber address (e.g., the address associated with the subscriber account, be it a home address, a business address, or the like), a mobile device number associated with the subscriber (e.g., if the Internet service provider also provides mobile phone services), a location of the subscriber (e.g., a current location, if the Internet service provider has access to information about the subscriber's mobile device(s)), a DNS query history of the subscriber, demographic information of the subscriber (e.g., age, marital status, employment status, education level, language preference, etc.), and/or other information that the subscriber may be willing to divulge to trusted Internet content providers in order to improve content customization (i.e., subscriber consent or subscriber opting in to a service that allows such subscriber information to be provided to the trusted Internet content providers).

In a further example, the subscriber profile associated with a subscriber may also include a list of Internet content providers which the subscriber considers trusted and/or untrusted. That is, the subscriber profile may identify a limited list of Internet content providers with whom the subscriber's data may be shared, and/or a limited list of Internet content providers with whom the subscriber's data may not be shared. In a further example, the subscriber profile may identify specific subsets of the subscriber data that may or may not be stored with specific Internet content providers or types of Internet content providers. For instance, the subscriber profile may authorize information about a subscriber's DNS query history, but not location, to be shared with Internet content providers which provide social media services. The same subscriber profile may authorize both DNS query history and location data to be provided to Internet content providers which provide search engines (or to be provided to specific search engines). The subscriber profile may authorize identification information in the subscriber profile to be shared with a specific financial institution with which the subscriber has an account (e.g., examplebank.com). Thus, a first subset of the subscriber data that is allowed to be shared with a first Internet content provider (or type of Internet content provider) may differ from a second subset of the subscriber data that is allowed to be shared with a second Internet content provider (or second type of Internet content provider).

In one example, the subscriber profiles 132 are stored in encrypted form in the DB 106 to protect subscriber privacy. Subscribers may have the option to opt out of having their subscriber profiles 132 stored in the DB 106 for the purposes of sharing with Internet content providers. However, if a subscriber opts out of storing a subscriber profile, the subscriber will likely have to either: (1) accept cookies (which may, if done by default, result in untrusted Internet content providers obtaining sensitive information) or (2) block cookies (and not receive a content-rich, customized browsing experience, which may or may not be a concern for some subscribers).

The list of trusted Internet content providers 134 may comprise a list of Internet content providers that have been vetted, such that the AS 104 has been pre-authorized to share information in the subscriber profiles 132 with the Internet content providers which are included in the list of trusted Internet content providers 134. In one example, in order to be included in the list of trusted Internet content providers 134, an Internet content provider may be vetted by some third party who is not a subscriber or the Internet service provider who operates the core network 102. For instance, an Internet content provider may be approved for inclusion in the list of trusted Internet content providers 134 based on a rating of the Internet content provider in an industry database and/or on a domain reputation of the Internet content provider. In another example, a subscriber may provide a list of Internet content providers which he or she trusts, as discussed above.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for sharing user data with Internet content providers via a trusted system, as described herein. An example method for sharing user data with Internet content providers via a trusted system is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
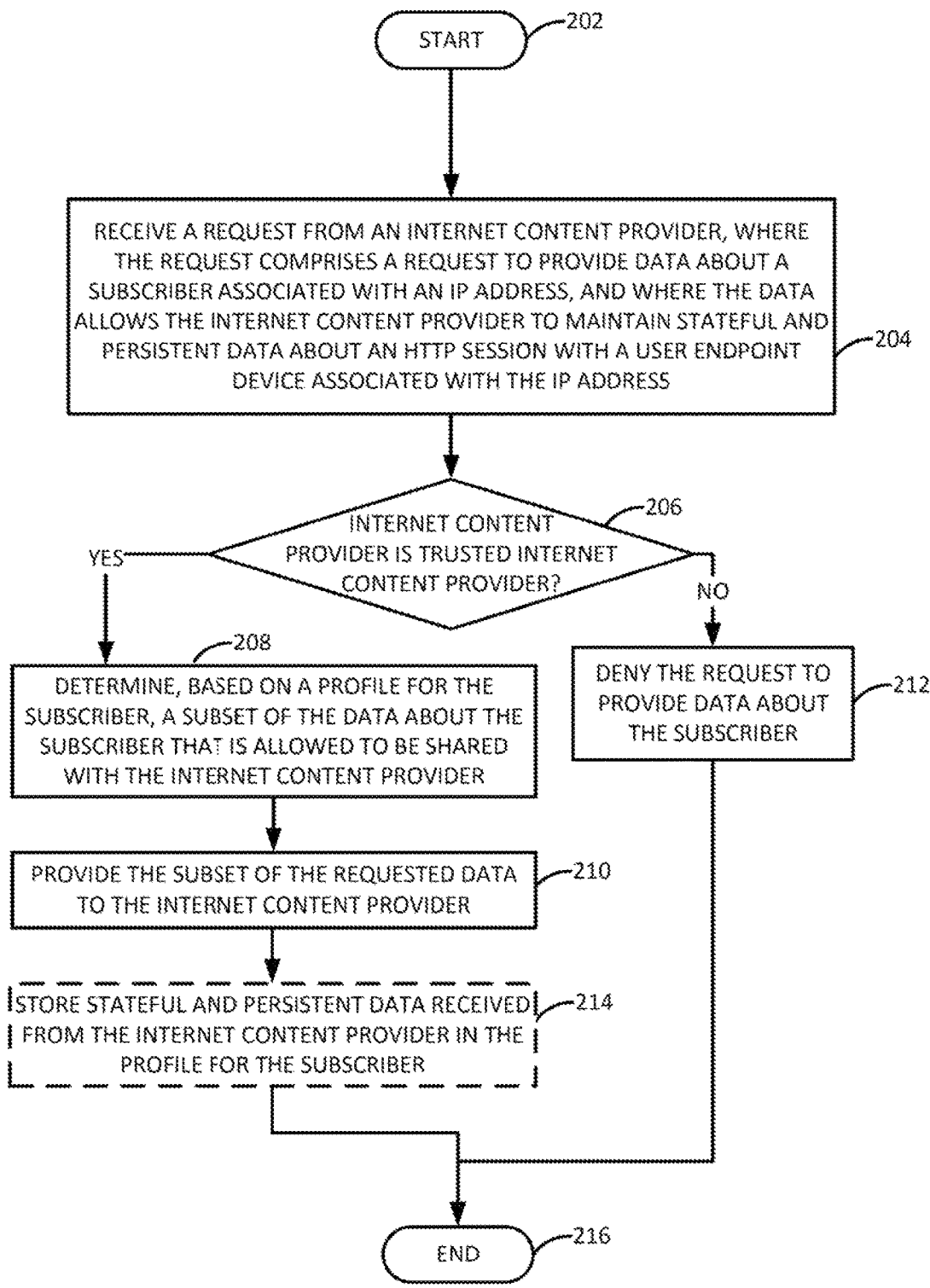
FIG. 2 illustrates a flowchart of an example method for sharing user data with Internet content providers via a trusted system, in accordance with the present disclosure.

FIG. 2 illustrates a flowchart of an example method 200 for sharing user data with Internet content providers via a trusted system, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system in an Internet service provider network, such as processing system 302.

The method 200 begins in step 202 and proceeds to step 204. In step 204, the processing system may receive a request from an Internet content provider, where the request comprises a request to provide data about a subscriber associated with an IP address, and where the data about the subscriber comprises data for allowing the internet content provider to maintain stateful and persistent information a communication session over the world wide web (e.g., an HTTP session) between the internet content provider and a user endpoint device associated with the internet protocol address. In one example, the IP address is a public IP address that is replaced with a private IP address on the user endpoint device (e.g., in accordance with carrier grade network address translation). In one example, the public IP address is an IPv4 or IPv6 address that is not unique to the user endpoint device. In other words, multiple subscriber networks including a network that includes the user endpoint device may share a common public IP address. However, the processing system may know the private IP address with which the public IP address is replaced on the user endpoint device. In other examples, the IP address may be a public IP address that is unique to the user endpoint device.

Non-unique public IP addresses related to NAT functions may be more commonly used in enterprise-initiated queries. For instance, an enterprise may utilize the disclosed system to ensure that cookies are not stored on the enterprise's networked computing devices. The enterprise may also establish profiles for the enterprise's employees which may restrict the employees' Internet usage or may enforce other policies related to Internet usage.

In one example, the requested data may comprise data that is typically stored in a cookie, such as at least one of: subscriber name, subscriber identifier (e.g., a numerical or alphanumeric identifier that does not identify the subscriber by name), subscriber address (e.g., the address associated with the subscriber account, be it a home address, a business address, or the like), a mobile device number associated with the subscriber (e.g., if the Internet service provider also provides mobile phone services), a location of the subscriber (e.g., a current location, if the Internet service provider has access to information about the subscriber's mobile device(s)), a DNS query history of the subscriber, demographic information of the subscriber (e.g., age, marital status, employment status, education level, language preference, etc.), and/or other information about the subscriber. Thus, the requested data may comprise data that allows the Internet content provider to maintain stateful and/or persistent information about an HTTP session with the user endpoint device.

In one example, the processing system may receive an explicit request for data from the Internet content provider in step 204 (e.g., a message that is directed to the processing system and specifies the data requested). In another example, however, the processing system may intercept an attempt by the Internet content provider to install a cookie on the user endpoint device (e.g., a message that is directed to the user endpoint device), where the data that is requested can be inferred from the cookie that the Internet content provider attempted to install.

In step 206, the processing system may determine whether the Internet content provider is a trusted Internet content provider which is pre-authorized to receive at least some of the requested data. In one example, determining whether the Internet content provider is a trusted Internet content provider may involve consulting a list of trusted Internet content providers in order to see if the Internet content provider is on the list. In one example, the list may be vetted by a party who is not the subscriber associated with the user endpoint device, the Internet service provider, or the Internet content provider. For instance, the list may be based at least in part on the contents of an industry database and/or on domain reputations of the trusted Internet content providers.

In some examples, the list of trusted Internet content providers may additionally define policies for the trusted Internet content providers that may allow the processing system to assist in some way other than providing the requested data. For instance, a policy for a particular Internet content provider may specify that the Internet content provider cannot receive certain types of data, but that the user endpoint device may be directed to a specific web site associated with the Internet content provider that may not require the types of data that the processing system is unable to provide.

If the processing system determines in step 206 that the Internet content provider is a trusted Internet content provider, then the method 200 may proceed to step 208. In step 208, the processing system may determine, based on a profile for the subscriber associated with the user endpoint device, a subset of the requested data (i.e., the data about the subscriber that is requested by the Internet content provider) that is allowed to be shared with the Internet content provider. As discussed above, the processing system may translate a public IP address associated with a request (e.g., an HTTP GET request) into a private IP address on a user endpoint device in the Internet service provider network. Identifying information for the user endpoint device may be used to look up a subscriber profile in a database, where the subscriber profile contains information about the subscriber associated with the user endpoint device. In one example, the subscriber profile may contain data that is typically stored in a cookie, such as at least one of: subscriber name, subscriber identifier (e.g., a numerical or alphanumeric identifier that does not identify the subscriber by name), subscriber address (e.g., the address associated with the subscriber account, be it a home address, a business address, or the like), a mobile device number associated with the subscriber (e.g., if the Internet service provider also provides mobile phone services), a location of the subscriber (e.g., a current location, if the Internet service provider has access to information about the subscriber's mobile device(s)), a DNS query history of the subscriber, demographic information of the subscriber (e.g., age, marital status, employment status, education level, language preference, etc.), and/or other information about the subscriber.

As discussed above, the subscriber profile may indicate how much of the data (e.g., which types of data) contained in the subscriber profile may be shared with trusted Internet content providers. In a further example, the subscriber profile may indicate which specific types of data may be shared with which specific Internet content providers or types of Internet content providers. For instance, the subscriber profile may authorize information about a subscriber's DNS query history, but not location, to be shared with Internet content providers which provide social media services. The same subscriber profile may authorize both DNS query history and location data to be provided to Internet content providers which provide search engines (or to be provided to specific search engines). The subscriber profile may authorize identification information in the subscriber profile to be shared with a specific financial institution with which the subscriber has an account (e.g., examplebank.com). In one example, the subset of the requested data may comprise all of the requested data. However, in other examples, the subset of the requested data may comprise less than all of the requested data.

In step 210, the processing system may provide the subset of the requested data to the Internet content provider. Having the subset of the requested data may allow the Internet content provider to provide the content requested by the user endpoint device to the user endpoint device in a manner that is customized or personalized for the associated subscriber.

In optional step 214 (illustrated in phantom), the processing system may store stateful and/or persistent data related to the subscriber, and received from the Internet content provider, in the profile for the subscriber. For instance, if the Internet content provider is a web site for an automobile manufacturer, the web site may have a feature that allows a visitor to customize a vehicle (e.g., select make, model, trim, interior and exterior colors, and/or other options). If the subscriber used this feature to customize a vehicle, the Internet content provider may send data about the subscriber's selections to the processing system for storage in the subscriber's profile. Then, when the subscriber revisits the web site, the data may be retrieved from the profile for the subscriber's review. Similarly, the subscriber's search history on the web site, history of items viewed on the web site, and/or other activities on the web site may be stored in the profile for future reference. In this way, the subscriber's activity on the web site may be saved for future use by the subscriber, without the need to store data about the activity as a cookie on the subscriber's device.

In one example, Internet content providers may subscribe to a service, accessible via the processing system, which allows the Internet content providers to store stateful and persistent data about user activity in the subscriber profiles in this manner. Thus, the ability for Internet content providers to store data in subscriber profiles may comprise an added or premium feature that is available to Internet content providers.

Referring back to step 206, if the processing system determines that the Internet content provider is not a trusted Internet content provider, then the method 200 may proceed to step 212. In step 212, the processing system may deny the request to provide data about the subscriber. In one example, the processing system may deny the request by simply not responding to the request. In another example, the processing system may deny the request by sending a message to the Internet content provider informing the Internet content provider that the requested data cannot be provided. In a further example, the processing system may also inform the user endpoint device that an untrusted Internet content provider has requested the data about the subscriber. This allows the subscriber to more easily police the usage of his or her personal data in the future.

Following the provision of the subset of the requested data in step 210, the optional storage of data from the Internet content provider in step 214, or denial of the request to provide the requested data in step 212, the method 200 may end in step 216.

Thus examples of the present disclosure, in essence, replace the use of cookies with a system that provides improved protection of user data, without disrupting the user's browsing experience or preventing trusted Internet service providers from providing customized content to users. In particular, examples of the present disclosure leverage the unique, trusted relationship that Internet service providers have both with their subscribers (e.g., end users who do not want cookies stored on their computing devices) and with trusted Internet content providers (who need to know information about the end users). Thus, a subscriber may be able to receive high-quality customized content from trusted Internet content providers without compromising his or her personal data by inadvertently or unknowingly providing the personal data to untrusted Internet content providers.

Moreover, the method 200 may be performed in a manner that is transparent to the subscriber. That is, the method 200 may ensure that the subscriber's personal data is provided only to trusted Internet content providers and only in a manner that is approved by the subscriber, without requiring subscriber intervention (e.g., without requiring the subscriber approve sharing of the subscriber's data each time an Internet content provider requests the subscriber's data).

In some examples, Internet content providers may subscribe to a service that makes certain additional subscriber information available. For instance, as discussed above, an additional feature of the disclosed method may allow Internet content providers to store stateful and persistent data about a user's activity or interaction with the Internet content provider (e.g., customization of an item on a web site, search results on a web site, items viewed on a web site, etc.). In another example, raw and/or analyzed data about subscriber demographics (e.g., location, language preference, relative income level, etc.) which may be inferable from subscriber IP addresses as described above (e.g., where certain blocks of IP addresses may be associated with specific geographic locations or other demographics), may be available to Internet content providers who subscribe to access this data.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for sharing user data with Internet content providers via a trusted system, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for sharing user data with Internet content providers via a trusted system (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for sharing user data with Internet content providers via a trusted system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system of an internet service provider network including at least one processor, a request from an internet content provider, wherein the request comprises a request to provide data about a subscriber associated with an internet protocol address, and wherein the data about the subscriber comprises data for allowing the internet content provider to maintain stateful and persistent information about a communication session over a world wide web between the internet content provider and a user endpoint device associated with the internet protocol address;
determining, by the processing system, whether the internet content provider is a trusted internet content provider which is pre-authorized to receive at least some of the data about the subscriber;
determining, by the processing system and based on a profile for the subscriber, a subset of the data about the subscriber that is allowed to be shared with the internet content provider, when the internet content provider is determined to be a trusted internet content provider, wherein the profile contains stateful and persistent information that is related to the subscriber and received from the internet content provider, and wherein the stateful and persistent information allows the internet content provider to use data about the communication session when a new communication session is established between the internet content provider and the user endpoint device; and
providing, by the processing system, the subset of the data about the subscriber to the internet content provider, when the subset of the data about the subscriber is determined, or denying, by the processing system, the request to provide the data about the subscriber, when the internet content provider is determined not to be a trusted internet content provider.

2. The method of claim 1, wherein the internet protocol address is a public internet protocol address that is replaced with a private internet protocol address on the user endpoint device with which the subscriber is associated.

3. The method of claim 2, wherein the public internet protocol address is shared among a plurality of subscriber networks connected to the internet service provider network in accordance with carrier grade network address translation.

4. The method of claim 1, wherein the receiving comprises:
intercepting, by the processing system, an attempt by the internet content provider to install a cookie on the user endpoint device.

5. The method of claim 1, wherein the determining whether the internet content provider is a trusted internet content provider comprises:
consulting, by the processing system, a list of trusted internet content providers in order to see if the internet content provider is on the list.

6. The method of claim 5, wherein the list is vetted by a party other than the subscriber, or an operator of the internet service provider network.

7. The method of claim 5, wherein the list is based at least in part on contents of an industry database.

8. The method of claim 5, wherein the list is based at least in part on domain reputations of the trusted internet content providers.

9. The method of claim 1, wherein the subset of the data about the subscriber comprises at least one of: a name of the subscriber, an identifier of the subscriber, an address of the subscriber, a mobile device number associated with the subscriber, a location of the subscriber, a domain name server query history of the subscriber, or demographic information of the subscriber.

10. The method of claim 1, wherein the subset of the data about the subscriber is defined by the subscriber.

11. The method of claim 1, wherein the profile for the subscriber defines, for each internet content provider of a defined plurality of internet content providers, a respective subset of the data about the subscriber that is allowed to be shared.

12. The method of claim 11, wherein a first subset of the data about the subscriber that is allowed to be shared with a first internet content provider of the defined plurality of internet content providers is different than a second subset of the data about the subscriber that is allowed to be shared with a second internet content provider of the defined plurality of internet content providers.

13. The method of claim 1, wherein the profile for the subscriber defines, for each type of internet content provider of a defined plurality of types of internet content providers, a respective subset of the data about the subscriber that is allowed to be shared.

14. The method of claim 13, wherein a first subset of the data about the subscriber that is allowed to be shared with a first type of internet content provider of the defined plurality of types of internet content providers is different than a second subset of the data about the subscriber that is allowed to be shared with a second type of internet content provider of the defined plurality of types of internet content providers.

15. The method of claim 1, wherein the subset of the data about the subscriber comprises information that allows the internet content provider to customize content that is provided to the user endpoint device for the subscriber.

16. The method of claim 1, wherein the denying the request to provide the data about the subscriber comprises not responding to the request to provide the data about the subscriber.

17. The method of claim 1, wherein the denying the request to provide the data about the subscriber comprises sending a message to the internet content provider informing the internet content provider that the data about the subscriber cannot be provided.

18. The method of claim 1, wherein the internet content provider comprises an operator of a website.

19. A non-transitory computer-readable medium storing instructions which, when executed by a processing system of an internet service provider network including at least one processor, cause the processing system to perform operations, the operations comprising:
receiving a request from an internet content provider, wherein the request comprises a request to provide data about a subscriber associated with an internet protocol address, and wherein the data about the subscriber comprises data for allowing the internet content provider to maintain stateful and persistent information about a communication session over a world wide web between the internet content provider and a user endpoint device associated with the internet protocol address;
determining whether the internet content provider is a trusted internet content provider which is pre-authorized to receive at least some of the data about the subscriber;
determining, based on a profile for the subscriber, a subset of the data about the subscriber that is allowed to be shared with the internet content provider, when the internet content provider is determined to be a trusted internet content provider, wherein the profile contains stateful and persistent information that is related to the subscriber and received from the internet content provider, and wherein the stateful and persistent information allows the internet content provider to use data about the communication session when a new communication session is established between the internet content provider and the user endpoint device; and
providing the subset of the data about the subscriber to the internet content provider, when the subset of the data about the subscriber is determined, or denying, by the processing system, the request to provide the data about the subscriber, when the internet content provider is determined not to be a trusted internet content provider.

20. A device comprising:
a processing system of an internet service provider network including at least one processor; and
a non-transitory computer-readable medium storing instructions which, when executed by the processing system, cause the processing system to perform operations, the operations comprising:
receiving a request from an internet content provider, wherein the request comprises a request to provide data about a subscriber associated with an internet protocol address, and wherein the data about the subscriber comprises data for allowing the internet content provider to maintain stateful and persistent information about a communication session over a world wide web between the internet content provider and a user endpoint device associated with the internet protocol address;
determining whether the internet content provider is a trusted internet content provider which is pre-authorized to receive at least some of the data about the subscriber;
determining, based on a profile for the subscriber, a subset of the data about the subscriber that is allowed to be shared with the internet content provider, when the internet content provider is determined to be a trusted internet content provider, wherein the profile contains stateful and persistent information that is related to the subscriber and received from the internet content provider, and wherein the stateful and persistent information allows the internet content provider to use data about the communication session when a new communication session is established between the internet content provider and the user endpoint device; and
providing the subset of the data about the subscriber to the internet content provider, when the subset of the data about the subscriber is determined, or denying, by the processing system, the request to provide the data about the subscriber, when the internet content provider is determined not to be a trusted internet content provider.

* * * * *